US011443036B2

United States Patent
Robertson et al.

(10) Patent No.: US 11,443,036 B2
(45) Date of Patent: Sep. 13, 2022

(54) FACIAL RECOGNITION BASED SECURITY BY A MANAGEMENT CONTROLLER

(71) Applicant: HEWLETT PACKARD ENTERPRISE DEVELOPMENT LP, Houston, TX (US)

(72) Inventors: Naysen Robertson, Orangevale, CA (US); Sai Rahul Chalamalasetti, Palo Alto, CA (US); William James Walker, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 293 days.

(21) Appl. No.: 16/526,388

(22) Filed: Jul. 30, 2019

(65) Prior Publication Data

US 2021/0034742 A1 Feb. 4, 2021

(51) Int. Cl.
*G06F 21/55* (2013.01)
*G06F 21/32* (2013.01)
(Continued)

(52) U.S. Cl.
CPC ............ *G06F 21/554* (2013.01); *G06F 1/263* (2013.01); *G06F 21/32* (2013.01); *G06F 21/602* (2013.01);
(Continued)

(58) Field of Classification Search
CPC ........ G06F 21/554; G06F 1/263; G06F 21/32; G06F 21/602; G06F 1/24;
(Continued)

(56) References Cited

U.S. PATENT DOCUMENTS 7,136,513 B2 * 11/2006 Waehner .............. G06V 10/145
382/209
7,293,699 B2 * 11/2007 Jenkins .............. G06Q 20/1085
235/379
(Continued)

FOREIGN PATENT DOCUMENTS

CN 103885865 A * 6/2014
CN 204289159 U * 4/2015
(Continued)

OTHER PUBLICATIONS

Burt, Chris, Biometric update.com—Ambarella launches camera processor for real-time facial recognition on edge devices, Jan. 10, 2019 (8 pages).
(Continued)

*Primary Examiner* — Shahriar Zarrineh
(74) *Attorney, Agent, or Firm* — Trop, Pruner & Hu, P.C.

(57) ABSTRACT

In some examples, an apparatus includes a management controller for use in a computer system having a processing resource for executing an operating system (OS) of the computer system, the management controller being separate from the processing resource and to perform, based on operation of the management controller within a cryptographic boundary, management of components of the computer system, the management of components comprising power control of the computer system. The management controller is to receive sensor data, perform facial recognition based on the sensor data, and determine whether to initiate a security action responsive to the facial recognition.

13 Claims, 4 Drawing Sheets

(51) Int. Cl.
  *G06F 21/60* (2013.01)
  *G06F 1/26* (2006.01)
  *G06N 3/08* (2006.01)
  *G06V 40/16* (2022.01)
  *G06F 1/24* (2006.01)

(52) U.S. Cl.
  CPC ............. *G06N 3/08* (2013.01); *G06V 40/161* (2022.01); *G06V 40/172* (2022.01); *G06F 1/24* (2013.01); *G06F 2221/034* (2013.01)

(58) Field of Classification Search
  CPC ............. G06F 2221/034; G06F 1/3206; G06F 1/3287; G06K 9/00228; G06K 9/00288; G06K 9/00221; G06N 3/08; Y02D 10/00; Y02D 30/50
  See application file for complete search history.

(56) References Cited

U.S. PATENT DOCUMENTS

| | | | | |
|---|---|---|---|---|
| 7,634,662 | B2* | 12/2009 | Monroe | G08B 13/19671 382/117 |
| 9,367,730 | B2* | 6/2016 | Irmatov | G06K 9/00255 |
| 9,898,674 | B2* | 2/2018 | Connell, II | G06V 40/161 |
| 10,026,283 | B1* | 7/2018 | Liu | G08B 13/19602 |
| 10,686,793 | B2* | 6/2020 | Verma | H04W 12/08 |
| 10,740,446 | B2* | 8/2020 | Hardee | G06Q 20/40145 |
| 11,113,046 | B1* | 9/2021 | Bowen | H05K 7/1498 |
| 2004/0073806 | A1* | 4/2004 | Zimmer | G06F 21/57 713/189 |
| 2007/0094716 | A1* | 4/2007 | Farino | H04L 63/101 726/5 |
| 2007/0143606 | A1* | 6/2007 | Bandholz | G06F 21/85 713/168 |
| 2007/0204332 | A1 | 8/2007 | Pan | |
| 2009/0260081 | A1 | 10/2009 | Johnson et al. | |
| 2009/0293136 | A1 | 11/2009 | Campbell et al. | |
| 2010/0111377 | A1* | 5/2010 | Monroe | G07C 9/38 382/118 |
| 2012/0229636 | A1* | 9/2012 | Ogawa | H04N 19/154 348/222.1 |
| 2014/0064576 | A1* | 3/2014 | Gong | G06K 9/6202 382/118 |
| 2015/0086017 | A1* | 3/2015 | Taylor | H04W 12/068 380/270 |
| 2015/0104103 | A1* | 4/2015 | Candelore | G06V 20/52 382/195 |
| 2015/0325091 | A1* | 11/2015 | Hamilton | G07C 9/253 340/5.53 |
| 2015/0355911 | A1* | 12/2015 | Bibb, Jr. | G06F 21/572 713/2 |
| 2016/0026473 | A1* | 1/2016 | Bower, III | G06F 8/65 713/2 |
| 2016/0026549 | A1* | 1/2016 | Alshinnawi | G06F 11/2015 714/14 |
| 2016/0048573 | A1 | 2/2016 | Muttik et al. | |
| 2016/0343238 | A1* | 11/2016 | Olivares Arnaiz | H04W 4/80 |
| 2017/0011368 | A1* | 1/2017 | Trombino | G06Q 20/102 |
| 2017/0109531 | A1 | 4/2017 | Wang et al. | |
| 2017/0117813 | A1 | 4/2017 | Lee | |
| 2018/0075227 | A1* | 3/2018 | Sheikh | G06F 21/44 |
| 2019/0066328 | A1* | 2/2019 | Kwant | G06T 7/75 |
| 2019/0108735 | A1* | 4/2019 | Xu | G06V 40/166 |
| 2020/0133712 | A1* | 4/2020 | Rathineswaran | G06F 9/4843 |

FOREIGN PATENT DOCUMENTS

| | | | | |
|---|---|---|---|---|
| CN | 207158036 | U * | 3/2018 | |
| CN | 110147703 | A * | 8/2019 | |
| CN | 111158446 | A * | 5/2020 | |
| EP | 1975836 | B1 * | 9/2017 | .......... H04L 9/0827 |
| JP | 2008294805 | A * | 12/2008 | |
| KR | 101360246 | B1 * | 2/2014 | |
| KR | 20180109652 | A * | 10/2018 | |
| SE | 1651103 | A1 * | 2/2018 | |
| SE | 543586 | C2 * | 4/2021 | .......... G06F 21/32 |
| WO | WO-2016018390 | A1 * | 2/2016 | .......... G06F 21/572 |
| WO | WO-2016068943 | A1 * | 5/2016 | .......... H02J 7/0013 |
| WO | WO-2019090106 | A1 * | 5/2019 | .......... H04L 63/105 |

OTHER PUBLICATIONS

E. Kesavulu Reddy, "Neural Networks for Intrusion Detection and Its Applications," Proceedings of the World Congress on Engineering 2013, Jul. 2013, pp. 1-5, vol. II, WCE.

Wikipedia, Histogram of oriented gradients last edited Apr. 3, 2019 (7 pages).

* cited by examiner

FACIAL RECOGNITION BASED SECURITY BY A MANAGEMENT CONTROLLER

BACKGROUND

A computer system can include a processing resource to execute programs, such as an application program, an operating system, a firmware, and so forth. To protect against unauthorized access and attacks, a computer system can include a security subsystem.

BRIEF DESCRIPTION OF THE DRAWINGS

Some implementations of the present disclosure are described with respect to the following figures.

Figure 1:
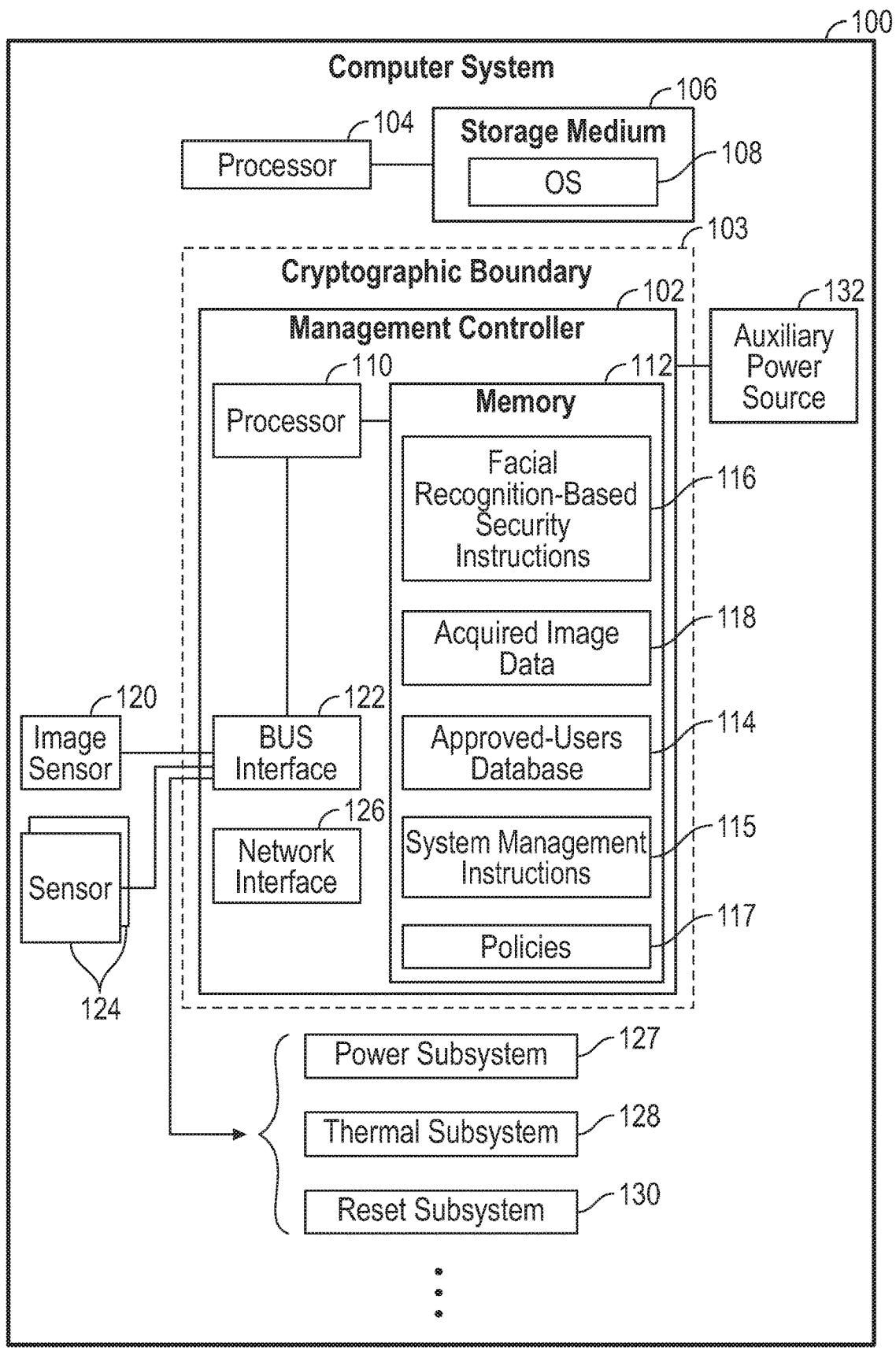
FIG. 1 is a block diagram of a computer system including a management controller according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a security subsystem used in a computer system can include a management controller that performs management tasks with respect to components of the computer system. For example, the management controller can include a Baseboard Management Controller (BMC) or another device that is separate from a host processor in the computer system. The host processor executes the operating system (OS) and/or other program code of the computer system. The processor can include any or some combination of the following: microprocessor, a core of a multi-core microprocessor, a graphics processing unit (GPU), a central processing unit (CPU), a programmable gate array, a programmable integrated circuit, a digital signal processor, a system on a chip (SoC), or another hardware processing circuit.

As used herein, a "BMC" is a specialized service processor that monitors the physical state of a computer system using sensors and communicates with a management system through an independent "out-of-band" connection. The BMC can be implemented using a processor that is separate from the processor executing the OS and/or other program code of a computer system.

A "computer system" can refer to any type of electronic device, such as a desktop computer, notebook computer, server computer, tablet computer, smartphone, a game appliance, Internet-of-Things (IoT) device, communication device (e.g., a switch, a router, a gateway, etc.), or any other type of device.

The BMC may also communicate with applications executing at the OS level through an input/output controller (IOCTL) interface driver, a Representational state transfer (REST) application program interface (API), or some other system software proxy that facilitates communication between the BMC and applications. The BMC may have hardware level access to hardware components located in the computer system. The BMC may be able to directly modify the hardware components. The BMC may operate independently of the OS of the computer system that the BMC is located in. The BMC may be located on the motherboard or main circuit board of the computer system to be monitored. The fact that a BMC is mounted on a motherboard of the managed computer system or otherwise connected or attached to the managed computer system does not prevent the BMC from being considered separate from a processing resource that executes the OS. A BMC has management capabilities to manage components of the computer system. Examples of management capabilities of the BMC can include any or some combination of the following: power control, thermal monitoring and control, fan control, system health monitoring, remote access of the computer system, remote reboot of the computer system, system setup, OS image deployment and recovery, system security, and so forth.

In some examples, a BMC can provide so-called "lights-out" functionality for computer systems. The lights out functionality may allow a user, such as a systems administrator to perform management operations on the computer system even if an OS is not installed or not functional on the computer system. Moreover, in some examples, the BMC can run on auxiliary power (e.g., battery power or an auxiliary power rail); as a result, the computer system does not have to be powered on to allow the BMC to perform its operations. The services provided by the BMC may be considered "out-of-band" services, since the OS may not be running and in some cases the computer system may be powered off or is not functioning properly (e.g., the computer system has experienced a fault or hardware failure).

The BMC may include a communication interface, such as a network interface, and/or a serial interface that an administrator or other entity can use to remotely communicate with the BMC. An "out-of-band" service can be provided by the BMC via a dedicated management channel (e.g., the communication interface) and is available whether the computer system is in a powered on state.

Although security subsystems implemented using BMCs are effective against many types of unauthorized access and attacks, the security subsystems according to some examples may not be effective against certain physical attacks of the security subsystems or a computer system. For example, an unauthorized user may attempt to physically intrude into the computer system, such as to monitor information communicated over communication channels with the BMC for the purpose of stealing the information or to determine a way to gain access to the data or programs of the computer system in which the BMC resides. Another form of physical attack is reverse engineering of the security subsystem including the BMC. A further form of physical attack involves an attack in which an intruder introduces an external device to the computer system for the purpose of monitoring data, hijacking the computer system, perform transmission of information to an external entity, accepting remote commands, and/or performing other unauthorized tasks.

In accordance with some implementations of the present disclosure, security techniques and systems are provided to protect against physical attacks or other forms of unauthorized access or attacks of computer systems. The security techniques and systems can be implemented using BMCs (or more generally, management controllers) to receive sensor data from a collection of sensors and to perform facial recognition based on the sensor data. A "collection of sensors" can include a single sensor, or alternatively, multiple sensors. A BMC can perform a security action responsive to the facial recognition and in accordance with security policies (such as those set by system administrator(s) or other entities) using an existing or standard system management, control and configuration interface provided by the BMC.

Based on the facial recognition performed by the BMC, the BMC is able to determine whether to initiate a policy-based security action. The BMC may exist behind a cryptographic boundary, where the BMC is able to perform management operations for a computer system, including power management and other forms of management operations as discussed above. In the case where the management controller is behind a cryptographic boundary, the management controller is secure so that a rogue entity would find it difficult to defeat the security mechanism implemented by the management controller based on facial recognition. Moreover, the capability of the management controller to perform various management operations can be leveraged to take a security action for the computer system in case of detection of an attack based on the facial recognition.

An example of a cryptographic boundary can be according to Federal Information Processing Standards (FIPS) Publication 140-2, which describes different approved security levels for computer systems based on use of cryptographic algorithms. A computer component (hardware and/or machine-readable instructions) that exists within the cryptographic boundary may be covered under one of these security levels. In other examples, other types of cryptographic algorithms can be employed by a computer component to protect the computer component in cryptographic boundaries corresponding to the cryptographic algorithms. A computer component that performs operations (such as facial recognition according to some examples of the present disclosure) behind a cryptographic boundary is intrinsically more secure and more tamper resistant.

FIG. 1 is a block diagram of a computer system 100 that includes a management controller 102, such as a BMC. In the examples according to FIG. 1, the management controller 102 is included within an enclosure of the computer system 100, where the enclosure can be defined by an outer chassis of the computer system 100. In other examples, the management controller 102 can be remote from the computer system 100 that is managed by the management controller 102, with the management controller 102 being able to communicate with the computer system 100 over a network or other communication link.

The management controller 102 is within a cryptographic boundary 103, which is based on implementation of a cryptographic algorithm, such as to provide any of the security levels as specified by FIPS Publication 140-2, by the management controller 102. The implementation of the cryptographic algorithm causes operations of the management controller 102 to be protected by the cryptographic algorithm such that unauthorized entities would find it difficult to successfully tamper with the operations of the management controller 102.

The computer system 100 includes a host processor 104, which is coupled to a storage medium 106 that stores an OS 108 of the computer system 100.

As used herein, an "operating system" or "OS" includes machine-readable instructions executable by a host processor (e.g., 104). An OS may include system software that controls access to computer hardware and manages software resources, as well as provides services for computer programs. The OS may facilitate communications between computer hardware and an application program. The OS may include a user interface that allows a user to interact with a computer system. During startup of the computer system, the OS may be read from a storage medium (e.g., 106) and executed by the host processor.

The host processor 104 that executes the OS 108 is separate from the management controller 102.

Note that the host processor 104 and the separate management controller 102 can be mounted on the same circuit board, or can be mounted on separate circuit boards. In further examples, the host processor 104 and the separate management controller 102 can include separate cores of a multi-core microprocessor.

The management controller 102 includes a processor 110 and an internal memory 112. In some examples, the memory 112 includes a nonvolatile memory, which can include a flash memory device(s), a storage disk drive, or any other type of memory that is able to retain data stored in the memory when power is removed from the memory or from the computer system 100.

The memory 112 can store various data and machine-readable instructions. Examples of machine-readable instructions that can be stored in the memory 112 include system management instructions 115 that are executable by the processor 110 to perform the management operations of the management controller 102, such as any of the management operations discussed for a BMC further above, for example.

The memory 112 can also store facial recognition-based security instructions 116 that are executable by the processor 110 to perform facial recognition based on acquired image data 118, and to perform a policy-based security action (based on a policy of policies 117 stored in the memory 112, for example) responsive to the facial recognition when an attack is detected. The acquired image data 118 is received by the management controller 102 from an image sensor 120 and stored in the memory 112 for processing by the facial recognition-based security instructions 116 executed by the processor 110.

The management controller 102 includes a bus interface 122 that allows the management controller 102 to communicate over a bus or other communication channel with the image sensor 120, as well as with other components, such as additional sensors 124 of the computer system 100, or sensors outside of the computer system 100.

Although the image sensor 120 is shown as being part of the computer system 100, the image sensor 120 can alternatively be external of the computer system 100, and can be in communication with the computer system 100 over a wired link or a wireless link. In further examples, there can be multiple image sensors that provide image data to the management controller 102.

The image sensor 120 is pointed in a particular direction for detecting objects, such as users (and more specifically, faces of users). The orientation of the image sensor 120 can be fixed, or alternatively, the image sensor 120 may be movably mounted such that the image sensor 120 can pivot and move to face different directions.

The system management instructions 115 when executed by the processor 110 can manage various aspects of the computer system 100, such as by interacting with various subsystems of the computer system 100, including a power subsystem 127, a thermal subsystem 128, a reset subsystem 130, and so forth. For example, the system management instructions 115 can interact with the power subsystem 127 to perform power up or power down or other power management tasks with respect to the computer system 100. Such other power management tasks can include placing the computer system 100 into a lower power state, such as a sleep state. Further power management tasks controlled by the system management instructions 115 in conjunction with the power subsystem 127 can include selecting power down of selected computer components within the computer system 100.

The system management instructions 115 can interact with the thermal subsystem 128 to monitor temperatures of the computer system 100 and to perform thermal management with respect to the computer system 100, such as by actively cooling equipment (including fans, etc.) in response to detected elevated temperatures, slowing down or shutting off computer components to reduce heat generation, and so forth.

The system management instructions 115 can interact with a reset subsystem 130 to cause a reset of the computer system 100, such as to reboot the computer system 100.

The computer system 100 can include other subsystems that can be controlled by the system management instructions 115 to perform other management operations.

The other sensors 124 that are coupled to the bus interface 122 of the management controller 102 can include any or some combination of the following: an accelerometer to detect acceleration associated with the computer system 100; a rotation sensor (such as a gyroscope) to detect rotational movement of the computer system 100; an audio sensor to detect audio levels in the computer system 100 or an environment of the computer system 100; a light sensor to detect light inside the computer system 100 or light outside of the computer system 100; a sensor (e.g., electrical contact based sensor, magnetic sensor, etc.) to detect opening of a cover of the computer system 100; an environmental sensor (e.g., to detect temperature, pressure, humidity, etc.), and so forth.

The management controller 102 also includes a network interface 126 that allows the management controller 102 to communicate over a network, such as a wired network or a wireless network. A wired network can include an Ethernet network, for example. A wireless network can include a wireless local area network (WLAN), a Bluetooth link, a cellular network, and so forth.

The network interface 126 can allow a remote computer, such as one associated with a system administrator or other user, to remotely access the computer system 100 through the management controller 102 for managing operations of the computer system 100, including any of the foregoing operations.

The memory 112 also stores an approved-users database 114, which includes a repository containing parametric data associated with facial images of users that are approved (or conversely, disapproved) to physically manipulate the computer system 100 and/or the management controller 102 or to be within the vicinity of the computer system 100 and/or the management controller 102.

Parametric data associated with a facial image of a user can include a set of parameters (including one parameter or multiple parameters) that represent various features of a user's face that allows for matching of one facial image to another facial image. The set of parameters used depends upon the facial recognition algorithm that is used.

The management controller 102 in some examples can also be connected to an auxiliary power source 132, which is separate from the main power supply (not shown) of the computer system 100. The main power supply of the computer system 100 can include a battery and/or an alternating current (AC) power adapter that can be plugged into an AC wall element. The auxiliary power source 132 is separate from the main power supply, and can continue to supply power to the management controller 102 even if the main power supply is not supplying power to the computer system 100, such as during times when the AC power adapter is not plugged into an AC wall outlet, or when the battery of the main power supply is depleted or removed.

The auxiliary power source 132 can be implemented using a battery or any other type of auxiliary power source.

If the auxiliary power source 132 such as a battery is present, the management controller 102 can be enabled to monitor the computer system's security (using techniques discussed in the present disclosure) during transit of the computer system (e.g., during shipment to a customer, a retailer, a distributor, etc.) and during certain stages of manufacturing of the computer system 100.

Figure 2:
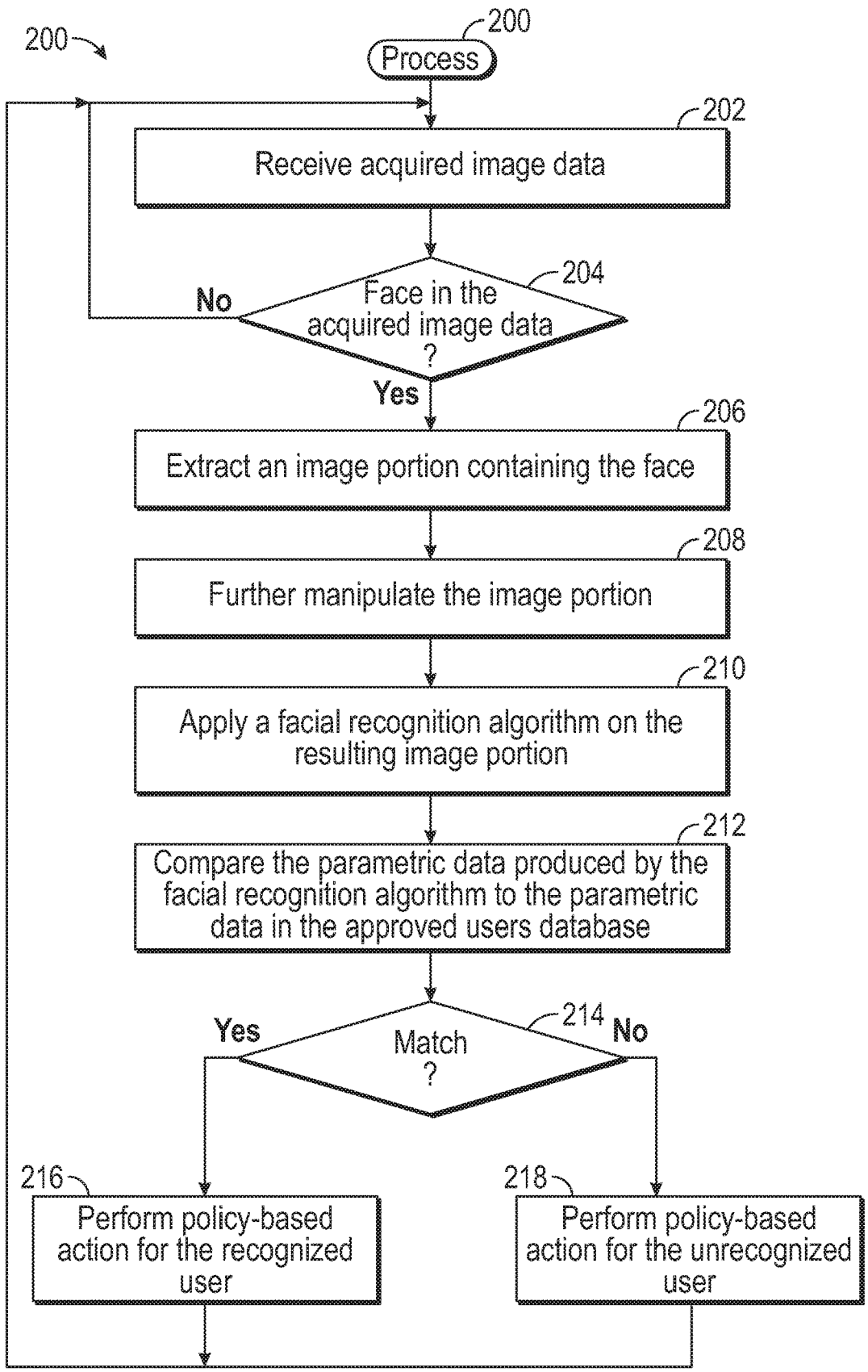
FIG. 2 is a flow diagram of a process according to some examples.

FIG. 2 is a flow diagram of a process 200 that can be performed by the facial recognition-based security instructions 116 when executed by the processor 110 of the management controller 102, for example.

The process 200 receives (at 202) an acquired image data (e.g., 118), such as acquired by the image sensor 120 of FIG. 1. The received image data can include multiple image frames, such as multiple image frames in a video stream. In some examples, the analysis performed according to the process 200 can be on a frame-by-frame basis.

The process 200 determines (at 204) whether a face is contained in the acquired image data. A face can refer to a face of a human or an animal.

If a face is not contained in the acquired image data, then the process 200 can end, and the process 200 returns to task 202 to process the next image.

In some examples, the determination of whether a face is contained in the acquired image data may be based on use of any of various techniques, such as a Histogram of Oriented Gradients (HOG) technique or other techniques for detecting presence of a face within an image.

In response to detecting a face in the acquired image data, the process 200 extracts (at 206) an image portion (which can be a subset less than the entirety of the acquired image data) that contains the face. Extracting the image portion that contains the face can allow the remaining portion of the acquired image data to not be processed further by the process 200, which reduces the processing load since less data has to be processed.

In some examples, the process 200 can further manipulate (at 208) the image portion. The further manipulation can include, for example, projecting to center of the image portion the eyes, nose, and lips within the image portion. For example, a face landmark estimation algorithm or other type of algorithm can be used to perform the projection. The face landmark estimation algorithm can analyze the image portion for landmarks associated with the face in the image portion so that the relevant parts (such as the eyes, nose, and lips) can be projected to the center of the image portion.

The process 200 can apply (at 210) a facial recognition algorithm on the resulting image portion (after extraction at 206 and manipulation at 208) to perform facial recognition of the face. For example, the facial recognition algorithm can include a neural network that has been trained for performing facial recognition. As examples, the neural network can be initialized and trained by assigning weights to neurons of the neural network. The training can be based on using training data that includes parametric data describing faces of known approved users.

Although reference is made to a neural network for performing facial recognition, it is noted that in other examples, other facial recognition algorithms can be used.

The facial recognition algorithm applied on the resulting image portion can produce parametric data based on the resulting image portion. The parametric data includes a set of parameters that is representative of a face if present in the resulting image portion. As an example, the parametric data includes value(s) of the set of parameters output by the facial recognition neural network, for example.

The process 200 compares (at 212) the parametric data produced by the facial recognition algorithm based on the resulting image portion to the parametric data in the approved-users database 114.

If the process 200 determines (at 214) that the parametric data produced by the facial recognition algorithm matches the parametric data of any user in the approved users database 114, then the process 200 can perform (at 216) a policy-based action for a recognized user (i.e., a user recognized as matching an approved user in the approved-users database 114).

Even if the user whose face appears in the acquired image data is a recognized user, a security policy may specify that the recognized user may access the computer system 100 under specific conditions, such as during business hours. If the recognized user attempts to access the computer system 100 outside of business hours, then information of the recognized user can be logged, and an alert can be generated that is sent to another entity, such as the user's supervisor or security personnel. The logging of the presence of the recognized user can include saving the acquired image data that contains the face of the matching user.

If the recognized user attempts to access the computer system 100 during business hours, then the policy-based action performed for the recognized user can include merely logging the presence of the recognized user, or alternatively, no action is performed. As further examples, a policy (or multiple policies) may specify that different users have varying access levels to the computer system 100, such as a server or other type of computer system. The policy or policies may specify that different users with different access levels are able to access different resources of the computer system 100. For example, a user with a first access level may be permitted to access a given program or stored data, while a user with a different second access level is not permitted to access the given program or stored data. In the foregoing example, the policy-based security action includes enabling or disabling access to the given program or stored data based on the access level of a user. As another example, a user with a first access level may access computer systems in a particular section of a data center or other environment, and not permitted to access computer systems in another section of the data center or other environment. However, a user with a different access level may be permitted to access computer systems in all sections of the data center or other environment. An access level of a user may be associated with an identifier or other credential of the user, and a policy may map different access levels to different resource access permissions.

However, if the process 200 determines (at 214) that the parametric data produced by the facial recognition algorithm does not match the parametric data of any user in the approved-users database 114, then the process 200 can perform (at 218) a policy-based action for an unrecognized user. For example, a security policy (which may be one of the policies 117 in FIG. 1) may specify that the policy-based action includes logging the presence of the unrecognized user, and can perform another security action according to the security policy, such as generating an alarm.

The security action that is initiated can be based on a security policy that can cause different actions to be performed under different conditions. In some cases, the security action that is performed can be based on sensor data from the further sensors 124. For example, the sensor data from the further sensors 124 can indicate whether the computer system 100 is being moved (which may indicate an attempt at stealing the computer system 100), whether light is present inside the computer system 100 (which may indicate that a cover of the computer system 100 has been opened in an attempt to physically hack the computer system, whether a sensor indicates that a cover has been opened, and so forth.

The combination of detecting the unrecognized and any of the foregoing conditions indicated by the sensor data of the further sensors 124 can cause the facial recognition-based security instructions 116 to trigger any or some combination of the following: powering down the computer system; powering off a computer component; quiescing any traffic on a bus that may be monitored; encrypting data communicated by the management controller 102 or another component of the computer system 100; and so forth.

Although FIG. 2 refers to examples where the parametric data produced from the acquired image data is compared to parametric data in the approved-users database 114, in other examples, the process 200 can compare the parametric data produced from the acquired image data to parametric data in a database for users known to be hackers or are unauthorized.

In further examples, the decision to take a security action may be based on analysis of a collection of images in a time window. The process 200 may recognize a face in some of the images of the collection of images, but may fail to recognize a face in other images of the collection of images. The inconsistencies in facial recognition may be due to poor image quality, so that a decision based on aggregating the analyses of multiple images may produce more accurate results.

Figure 3:
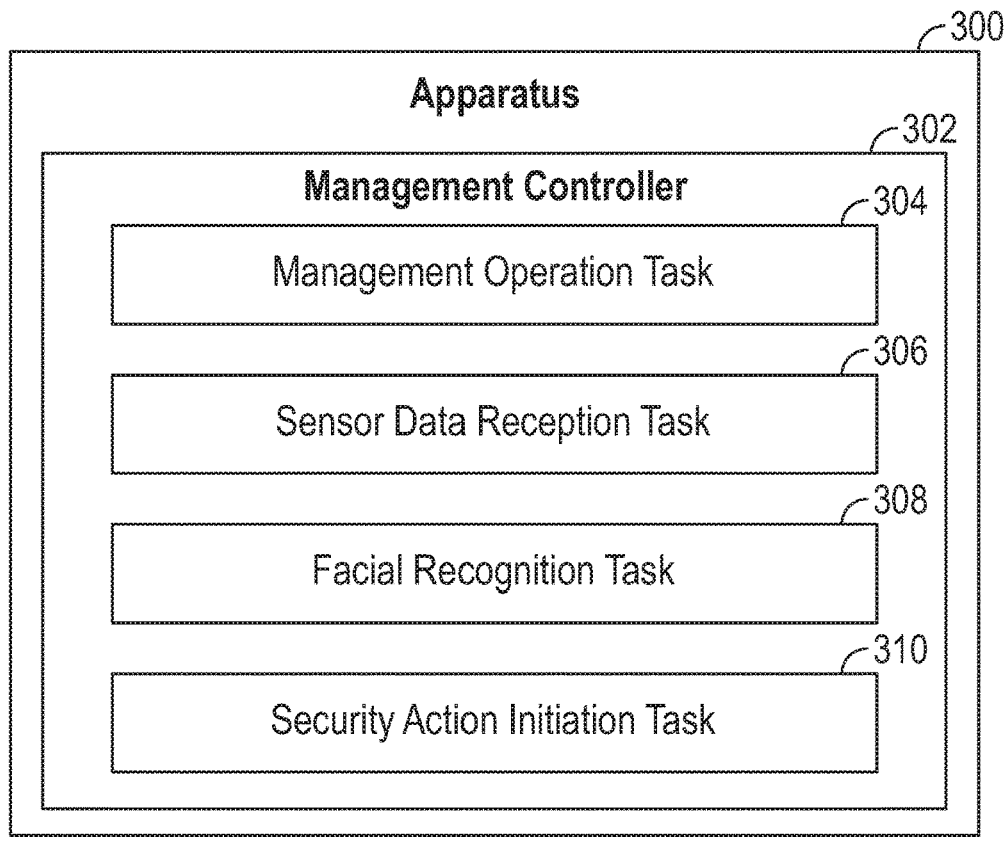
FIG. 3 is a block diagram of an apparatus comprising a management controller according to some examples.

FIG. 3 is a block diagram of an apparatus 300, which can be a computer, a circuit board, an integrated circuit device, and so forth. The apparatus 300 includes a management controller 302 for use in a computer system having a processing resource for executing an OS of the computer system. The management controller 302 is separate from the processing resource and is to perform various tasks, such as based on executing machine-readable instructions by the management controller 302.

The tasks that can be performed by the management controller 302 include a management operation task 304 to perform, based on operation of the management controller 302 within a cryptographic boundary, management of components of the computer system, the management of components including power control of the computer system.

The tasks further include a sensor data reception task 306 to receive sensor data, a facial recognition task 308 to perform facial recognition based on the sensor data, and a security action initiation task 310 to determine whether to initiate a security action responsive to the facial recognition.

The sensor data receiving task 306, the facial recognition task 308, and the security action initiation task 310 can be performed by the facial recognition-based security instructions 116 (FIG. 1), for example. The management operation task 304 can be performed by the system management instructions 115 (FIG. 1), for example.

In some examples, the security action initiation task 310 performed by the management controller 302 includes initiating the security action responsive to the facial recognition indicating that a user accessing the computer system is not an approved user.

In some examples that may be in combination with any of the foregoing aspects, the security action initiation task 310 performed by the management controller 302 includes initiating the security action according to a policy based on a condition associated with an attempted access of the computer system.

In some examples that may be in combination with any of the foregoing aspects, the security action is selected from among deactivating power to a portion of the computer system, quiescing data traffic on a communication channel, activating an alarm, activate data encryption, restrict access to the computer system, destroy data, record an image of a face detected by the facial recognition, or send alert (e.g., an email or other notification) to a target entity (e.g., a human administrator, an automated system, etc.).

In some examples that may be in combination with any of the foregoing aspects, the sensor data includes image data from an image sensor.

In some examples that may be in combination with any of the foregoing aspects, the security action initiation task 310 performed by the management controller 302 includes determining whether to initiate the security action in response to further sensor data from a further sensor different from the image sensor. For example, the further sensor can include any or some combination of the following: an accelerometer (e.g., to detect movement, vibration, an impulse, etc.), a rotation sensor (to detect rotational movement), an audio sensor (to detect audio levels), a light sensor (to detect light), a sensor to detect opening of a cover, an environmental sensor (e.g., to detect temperature, pressure, humidity, etc.), and so forth.

In some examples that may be in combination with any of the foregoing aspects, the management controller 302 is to log information relating to access by a user of the computer system responsive to the facial recognition indicating that a user accessing the computer system is an approved user.

In some examples that may be in combination with any of the foregoing aspects, the management controller 302 is a baseboard management controller.

In some examples that may be in combination with any of the foregoing aspects, the apparatus 300 includes an auxiliary power source (e.g., 132 in FIG. 1) to supply power to the management controller 302 when power is removed from the computer system.

In some examples that may be in combination with any of the foregoing aspects, the management controller 302 is to employ a neural network to perform the facial recognition.

In some examples that may be in combination with any of the foregoing aspects, the neural network is to categorize a face in an image included in the sensor data (i.e., to detect that the image includes a face, such as detected at 204 in FIG. 2), and the management controller 302 is to compare parametric data describing the face to a repository containing information relating to faces of authorized or unauthorized users (e.g., 114 in FIG. 1).

Figure 4:
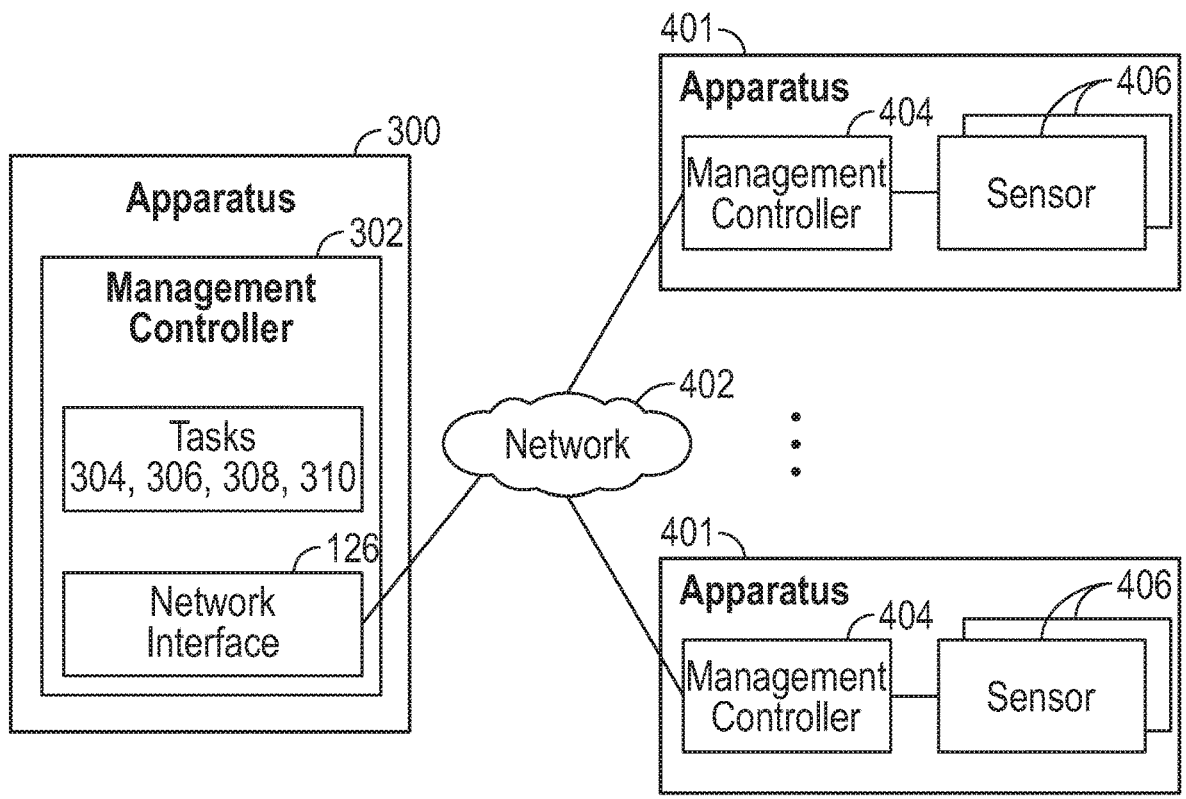
FIG. 4 is a block diagram of an arrangement that includes multiple management controllers interacting with one another, according to further examples.

In some examples that may be in combination with any of the foregoing aspects, the security action initiation task 310 performed by the management controller 302 includes initiating the security action further in response to further sensor data acquired by other management controllers remotely located from the management controller. For example, as shown in FIG. 4, the network interface 126 of the management controller 302 allows the management controller 302 to communicate over a network 402 with other management controllers 404 located at other locations (in other apparatus 401). The other management controllers 404 receive further sensor data from respective further sensors 406 connected to the other management controllers 404.

If the management controller 302 detects based on sensor data received by local sensors of the management controller that a certain condition is present (e.g., vibration has been detected), the management controller 302 can communicate with the other management controllers 404 to acquire the further sensor data to determine whether vibrations are also detected at the other locations. If so, that may be indicative of a widespread shaking event (e.g., an earthquake) such that the vibrations indicated by the local sensor data for the management controller 302 is not indicative of a theft event. As a result, the management controller 302 would not have to initiate a security action.

More generally, the interaction of the management controllers 302 and 404 in FIG. 4 allows for an analysis of data gathered from different management controllers to construct a collective image of an environment. In a further example, the management controller 302 that is able to perform the facial recognition task 308 and the security action initiation task 310 may be deployed at the edge of a network (such as in an edge server, an edge switch, or other device). The network can include multiple systems deployed across an area.

Information relating to recognition of a face (or faces) by the management controller 102 can be passed to another management controller (which may be located at an edge device or another device, indicated generally as apparatus 401 in FIG. 4), so that policy decisions may be made on data gathered across a network of management controllers. For example, a perceived attack on a first device can result in other devices being disabled or powered off. The decision to disable multiple devices may, for example, be taken after more than one management controller has observed an unrecognized face indicative of an intrusion.

In other examples, the management controller 302 can use further sensor data from the other management controllers 404 to confirm or check other conditions.

Figure 5:
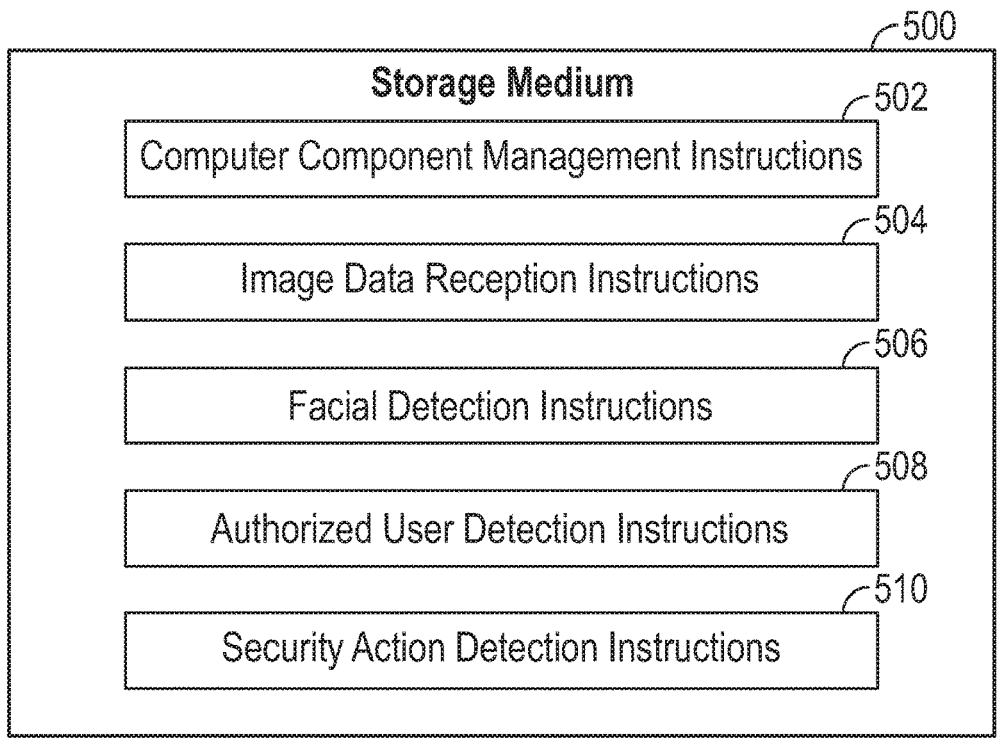
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a management controller to perform various tasks.

The machine-readable instructions include computer component management instructions 502 to perform, based on operation of the management controller within a cryptographic boundary, management of components of a computer system, the management of components comprising power control of the computer system.

The machine-readable instructions include image data reception instructions 504 to receive image data from an image sensor, such as the image sensor 120 of FIG. 1.

The machine-readable instructions include facial detection instructions 506 to detect a face in the image data.

The machine-readable instructions include authorized user determination instructions 508 to determine whether the detected face corresponds to an authorized user.

The machine-readable instructions include security action initiation instructions 510 to initiate a security action with respect to a computer system responsive to determining that the detected face does not correspond to an authorized user, where the management controller is separate from a processing resource of the computer system.

In some examples, the facial detection instructions 506 are to deploy a neural network to detect the face in the image data.

In some examples that may be in combination with any of the foregoing aspects, the machine-readable instructions further include instructions to receive further sensor data from a further sensor, where the security action initiation instructions 510 are to initiate the security action further in response to the further sensor data.

In some examples that may be in combination with any of the foregoing aspects, the security action comprises a countermeasure to restrict access of the computer system.

Figure 6:
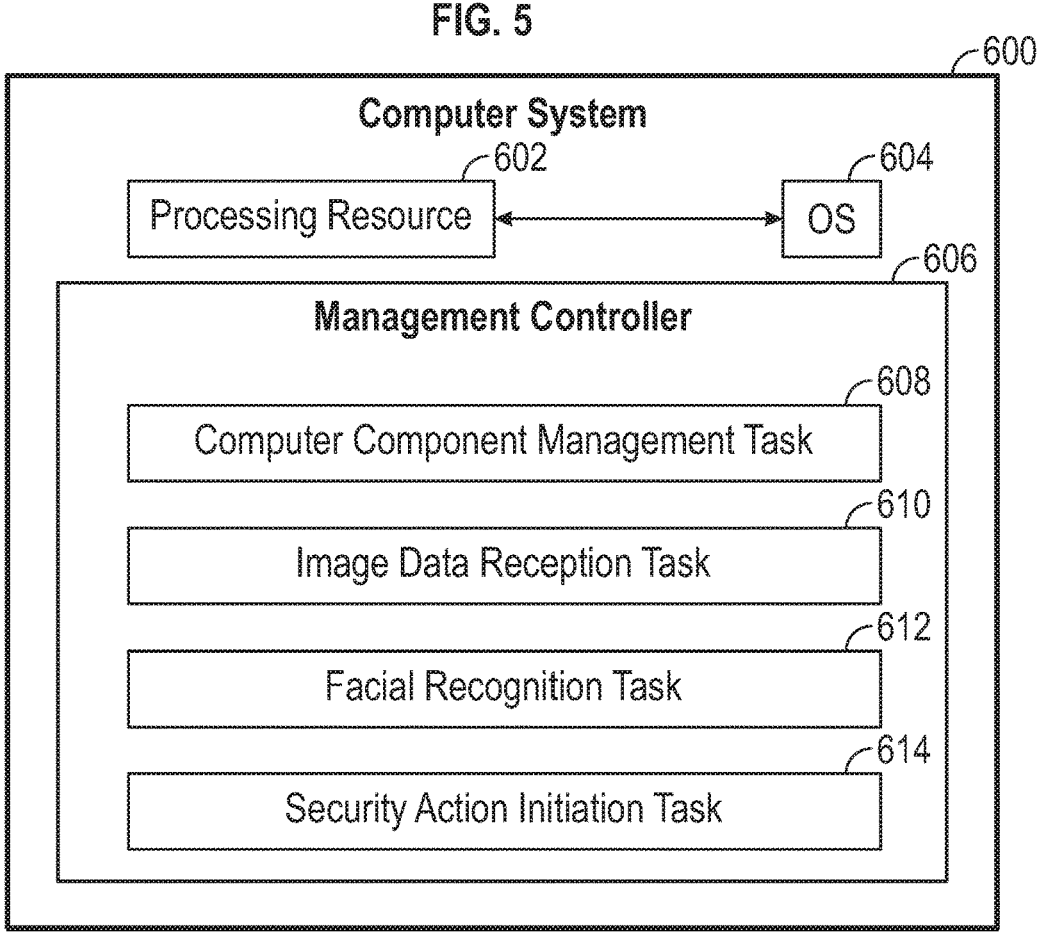
FIG. 6 is a block diagram of a computer system according to further examples.

FIG. 6 is a block diagram of a computer system 600 that includes a processing resource 602 (e.g., the host processor 104 of FIG. 1), and an OS 604 executable on the processing resource 602.

The computer system 600 further includes a management controller 606 separate from the processing resource. The management controller 606 is to perform various tasks. The tasks include a computer component management task 608 to perform, based on operation of the management controller 606 within a cryptographic boundary, management of components of the computer system 600, the management of components including power control of the computer system 600. The task 608 can be performed by the system management instructions 115 (FIG. 1) executed on the processing resource 602, for example.

The tasks further include an image data reception task 610 to receive image data, a facial recognition task 612 to perform facial recognition based on the sensor data and based on use of a neural network implemented by the management controller 606, and a security action initiation task 614 to determine whether to initiate a security action responsive to the facial recognition.

The image data reception task 610, the facial recognition task 612, and the security action initiation task 614 can be performed by the facial recognition-based security instructions 116 (FIG. 1) executed on the processing resource 602, for example.

In some examples, the determination of whether to initiate the security action is based on a security policy.

A storage medium (e.g., 500 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An apparatus comprising:
a first baseboard management controller (BMC) for use in a computer system having a processing resource for executing an operating system (OS) of the computer system, the first BMC being separate from the processing resource and to:
perform, based on operation of the first BMC within a cryptographic boundary, management of components of the computer system, the management of components comprising power control of the computer system;
receive image sensor data from an image sensor;
perform facial recognition based on the image sensor data;
receive, at the first BMC from a second BMC, further sensor data acquired by the second BMC remotely located from the first BMC;
determine, based on the further sensor data acquired by the second BMC, whether a condition present at a location of the image sensor is also present at a further location;
receive additional sensor data from an additional sensor, the additional sensor data indicative of whether a cover of the computer system has been opened; and
initiate a security action with respect to the computer system responsive to the facial recognition, the determination from the further sensor data of whether the condition present at the location of the image sensor is also present at the further location, and determining from the additional sensor data that the cover of the computer system has been opened, wherein the security action comprises encrypting data communicated by the first BMC.

2. The apparatus of claim 1, wherein the first BMC is to log information relating to access by a user of the computer system responsive to the facial recognition indicating that the user accessing the computer system is an approved user.

3. The apparatus of claim 1, further comprising an auxiliary power source to supply power to the first BMC when power is removed from the computer system.

4. The apparatus of claim 1, wherein the first BMC is to employ a neural network to perform the facial recognition.

5. The apparatus of claim 4, wherein the neural network is to categorize a face in an image included in the image sensor data, and the first BMC is to compare parametric data describing the face to a repository containing information relating to faces of authorized or unauthorized users.

6. A non-transitory machine-readable storage medium comprising instructions that upon execution cause a first baseboard management controller (BMC) to:
perform, based on operation of the first BMC within a cryptographic boundary, management of components of a computer system, the management of components comprising power control of the computer system, wherein the first BMC is separate from a processing resource of the computer system;
receive image data from an image sensor;
detect a face in the image data;
determine whether the detected face corresponds to an authorized user;
receive second sensor data from a second sensor, the second sensor data indicative of whether a cover of the computer system has been opened;
receive, at the first BMC from a second BMC, third sensor data acquired by the second BMC remotely located from the first BMC;
determine, based on the third sensor data acquired by the second BMC, whether a condition present at a location of the image sensor is also present at a further location; and
initiate a security action with respect to the computer system responsive to determining that the detected face does not correspond to an authorized user, determining from the second sensor data that the cover of the computer system has been opened, and the determination from the third sensor data of whether the condition present at the location of the image sensor is also present at the further location, wherein the security action comprises encrypting data communicated by the first BMC.

7. The non-transitory machine-readable storage medium of claim 6, wherein the instructions upon execution cause the first BMC to employ a neural network to detect the face in the image data.

8. A computer system comprising:
a processing resource;
an operating system executable on the processing resource;
a first baseboard management controller (BMC) separate from the processing resource, the first BMC to:
perform, based on operation of the first BMC within a cryptographic boundary, management of components of the computer system, the management of components comprising power control of the computer system;
receive image data from an image sensor;
perform facial recognition based on the image data;
receive second sensor data from a second sensor, the second sensor data indicative of whether a cover of the computer system has been opened;
receive, at the first BMC from a second BMC, third sensor data acquired by the second BMC remotely located from the first BMC;
determine, based on the third sensor data acquired by the second BMC, whether a condition present at a location of the image sensor is also present at a further location;
determine to initiate a security action responsive to the facial recognition, determining from the second sensor data that the cover of the computer system has been opened, and the determination from the third sensor data of whether the condition present at the location of the image sensor is also present at the further location; and
perform the security action comprising encrypting data communicated by the first BMC.

9. The computer system of claim 8, wherein the facial recognition is based on use of a neural network that is to categorize a face in the image data, and wherein the first BMC is to:
compare parametric data describing the face to a repository containing information relating to faces of authorized or unauthorized users; and
initiate the security action responsive to the facial recognition indicating that a user accessing the computer system is not an approved user and is based on a security policy.

10. The apparatus of claim 1, wherein the first BMC is to initiate the security action responsive to the facial recognition indicating that a user accessing the computer system is not an approved user.

11. The apparatus of claim 10, wherein the first BMC is to initiate the security action according to a policy based on a condition associated with an attempted access of the computer system.

12. The apparatus of claim 10, wherein the security action further comprises an action selected from among deactivating power to a portion of the computer system, quiescing data traffic on a communication channel, or destroying data.

13. The apparatus of claim 1, wherein the further sensor data is from a further sensor selected from among a sensor to detect opening of a cover, an accelerometer, a light sensor, an audio sensor, a rotation sensor, or an environmental sensor.

* * * * *